US006207249B1

(12) United States Patent
Lencoski et al.

(10) Patent No.: US 6,207,249 B1
(45) **Date of Patent: *Mar. 27, 2001**

(54) CUSHIONING PRODUCT AND METHOD WITH STITCHING

(75) Inventors: Michael J. Lencoski, Claridon Township, OH (US); Edwin P. Belerlorzer, Bellevue, WA (US); Edward W. Lintala, Concord, OH (US)

(73) Assignee: Ranpak Corporation, Painesville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/070,231

(22) Filed: Apr. 30, 1998

Related U.S. Application Data

(63) Continuation-in-part of application No. 08/607,607, filed on Feb. 27, 1996, now Pat. No. 6,035,613, which is a continuation-in-part of application No. 08/487,012, filed on Jun. 7, 1995, now Pat. No. 5,755,656.

(60) Provisional application No. 60/046,798, filed on May 2, 1997.

(51) Int. Cl.[7] .................................. B32B 3/24; B31F 5/02

(52) U.S. Cl. ......................... 428/132; 428/34.2; 428/34.3; 428/124; 428/156; 428/153; 428/154; 428/126; 428/137; 428/136; 138/166; 493/464; 493/227; 493/233; 493/967; 206/584; 206/586; 206/814

(58) Field of Search .................................... 428/132, 34.2, 428/34.3, 124, 156, 153, 154, 126, 137, 136; 138/166; 493/464, 227, 233, 967; 206/584, 586, 814

(56) References Cited

U.S. PATENT DOCUMENTS

| | | | |
|---|---|---|---|
| T911,003 | 6/1973 | Himelreich, Jr. | 83/675 |
| 1,723,355 | 8/1929 | Kirschbraun | 162/171 |

(List continued on next page.)

FOREIGN PATENT DOCUMENTS

| | | |
|---|---|---|
| 30 26 685 A1 | 2/1982 | (DE) . |
| 995980 | 6/1965 | (GB) . |
| 1 420 139 | 1/1976 | (GB) . |
| WO 96/40493 | 12/1996 | (WO) . |

*Primary Examiner*—William P. Watkins, III

(74) *Attorney, Agent, or Firm*—Renner, Otto, Boisselle & Sklar, LLP

(57) ABSTRACT

A cushioning conversion machine, method and product characterized by a connecting assembly that provides a mechanical interlock between overlapped portions of sheet-like stock material to prevent "unzippering" of a low density cushioning product produced by the cushioning conversion machine. The connecting assembly comprises a pair of rotatable stitching members, a first one having a plurality of radially outwardly extending projections, or teeth, around the circumference thereof, with the projections having at least two axially spaced apart segments defining a recess therebetween. The second stitching member includes at least one axial punch segment which includes a peripheral edge portion dimensioned to be received in the recess in the first stitching member during rotation of the stitching members. The peripheral edge portion is cooperative with the projections of the first stitching member to produce at each corner edge thereof a row of slits in the overlapped portions of the sheet-like stock material, thereby forming at least one row of tabs for interlocking the overlapped portions of the stock material. The second stitching member may include another axial segment relatively adjacent the punch segment, such other axial segment having a plurality of radially outwardly extending projections meshing with the projections of one of the axial segments of the first stitching member. The stitching members may be formed by a plurality of flat disc members stacked side-by-side with the several axial segments being formed by one or more of the flat disc members.

13 Claims, 9 Drawing Sheets

U.S. PATENT DOCUMENTS

| | | | | |
|---|---|---|---|---|
| 1,989,794 | | 2/1935 | Duvall | 428/102 |
| 2,106,246 | | 1/1938 | Fourness | 428/154 |
| 2,273,162 | | 2/1942 | Willard | 270/52.11 |
| 2,663,072 | | 12/1953 | Pfistershammer | 29/521 |
| 2,721,709 | | 10/1955 | Auerbacher | 242/560.1 |
| 2,862,400 | | 12/1958 | D'Angelo | 74/460 |
| 2,882,802 | | 4/1959 | Walker | 493/46 |
| 2,935,002 | | 5/1960 | Robinson, Jr. | 493/363 |
| 3,033,064 | | 5/1962 | Lee | 83/114 |
| 3,238,852 | | 3/1966 | Schur et al. | 493/45 |
| 3,323,983 | | 6/1967 | Palmer et al. | 162/362 |
| 3,325,120 | | 6/1967 | Brinkman | 242/557 |
| 3,377,224 | | 4/1968 | Gresham et al. | 156/209 |
| 3,408,776 | | 11/1968 | Kalwaites | 451/55 |
| 3,427,912 | | 2/1969 | Nozawa et al. | 83/20 |
| 3,509,797 | | 5/1970 | Johnson | 493/340 |
| 3,518,147 | | 6/1970 | Harmsen | 156/252 |
| 3,546,742 | | 12/1970 | Kugler | 425/196 |
| 3,603,216 | | 9/1971 | Johnson | 93/1 |
| 3,613,522 | | 10/1971 | Johnson | 93/1 |
| 3,655,500 | | 4/1972 | Johnson | 161/104 |
| 3,682,028 | | 8/1972 | Clayton et al. | 83/30 |
| 3,703,432 | | 11/1972 | Koski | 161/110 |
| 3,741,079 | | 6/1973 | Bossons et al. | 93/1.1 |
| 3,789,757 | | 2/1974 | Motter et al. | 101/153 |
| 3,899,166 | | 8/1975 | Behn | 270/83 |
| 3,956,956 | | 5/1976 | Bertholf | 83/345 |
| 4,026,198 | | 5/1977 | Ottaviano | 93/1 WZ |
| 4,085,662 | | 4/1978 | Ottaviano | 93/1 WZ |
| 4,166,613 | | 9/1979 | Kort et al. | 270/21 |
| 4,237,776 | | 12/1980 | Ottaviano | 493/382 |
| 4,557,716 | | 12/1985 | Ottaviano | 493/464 |
| 4,679,459 | | 7/1987 | F'Gepppert | 74/460 |
| 4,717,613 | | 1/1988 | Ottaviano | 428/129 |
| 4,750,896 | | 6/1988 | Komaransky et al. | 493/357 |
| 4,839,210 | | 6/1989 | Komaransky et al. | 428/77 |
| 4,850,947 | | 7/1989 | Brown et al. | 493/365 |
| 4,884,999 | | 12/1989 | Baldacci | 493/439 |
| 4,937,131 | | 6/1990 | Baldacci et al. | 428/131 |
| 4,968,291 | | 11/1990 | Baldacci et al. | 493/354 |
| 4,977,807 | | 12/1990 | Kai et al. | 83/676 |
| 4,994,010 | | 2/1991 | Doderer-Winkler | 493/215 |
| 5,061,543 | | 10/1991 | Baldacci | 428/126 |
| 5,088,972 | | 2/1992 | Parker | 493/352 |
| 5,123,889 | | 6/1992 | Armington et al. | 493/352 |
| 5,173,352 | | 12/1992 | Parker | 428/174 |
| 5,188,581 | | 2/1993 | Baldacci | 493/381 |
| 5,246,656 | | 9/1993 | Stephenson et al. | 264/153 |
| 5,308,677 | * | 5/1994 | Renna | 428/174 |
| 5,340,638 | | 8/1994 | Sperner | 428/182 |
| 5,471,783 | | 12/1995 | McLean | 47/30 |
| 5,558,923 | * | 9/1996 | Vesamaa | 428/154 |
| 6,035,613 | * | 3/2000 | Lencoski et al. | 53/472 |

* cited by examiner

CUSHIONING PRODUCT AND METHOD WITH STITCHING

RELATED APPLICATIONS

This application claims priority from provisional application No. 60/046,798, filed May 2, 1997 and is a continuation-in-part of prior application Ser. No. 08/607, 607, filed on Feb. 27, 1996 now U.S. Pat. No. 6,035,613 which is a continuation-in-part of prior application Ser. No. 08/487,012 filed Jun. 7, 1995, now U.S. Pat. No. 5,755,656 both of which are hereby incorporated herein by reference in their entireties.

FIELD OF THE INVENTION

The herein described invention relates generally to a cushioning conversion machine and method for converting sheet-like stock material into a cushioning product, a novel form of a stitching assembly for connecting a cushioning product formed from sheet-like stock material, and a resultant novel cushioning product.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alterative. Paper is biodegradable, recyclable and composed of a renewable resource, making it an environmentally responsible choice for conscientious industries.

While paper in sheet form could possibly be used as a protective packaging material, it is usually preferable to convert the sheets of paper into a relatively low density pad-like cushioning dunnage product. This conversion may be accomplished by a cushioning conversion machine/method, such as those disclosed in U.S. Pat. Nos. 3,509,798, 3,603,216, 3,655,500, 3,779,039, 4,026,198, 4,109,040, 4,717,613 and 4,750,896, and also in U.S. patent application Ser. Nos. 07/533,755, filed Jun. 6, 1990, now U.S. Pat. No. 5,134,013; 07/538,181, filed Jun. 14, 1990, now U.S. Pat. No. 5,173,352; 07/592,573, filed Oct. 5, 1990, now U.S. Pat. No. 5,322,477; 07/734,512, filed Jul. 23, 1991, now U.S. Pat. No. 5,188,581; 07/786,573, filed Nov. 11, 1991, now U.S. Pat. No. 5,211,620; 07/840,306, filed Feb. 24, 1992, now abandoned; and 07/861,225, filed Mar. 31, 1992, now abandoned.

With most, if not all, of the conversion machines/methods disclosed in the above-identified patents and applications, the cushioning product is produced by converting multi-layer, and preferably three-layer, paper stock material into a desired geometry. The cushioning product includes pillow-like portions formed by the lateral edges of all of the layers of stock paper being rolled inwardly to form a pair of twin spirals. The central regions of this structure are then compressed and connected (such as by coining) to form a central compressed portion and two lateral pillow-like portions which essentially account for the cushioning qualities of the product.

The central compressed portion of such a cushioning product is believed to be necessary to ensure that the pillow-like portions optimally maintain their cushioning qualities. In other words, without a connection of this type, the resiliency of the pillow-like portions would encourage the twin spirals to "unwind." However, the central portion, due to its compressed state, increases the density of the overall cushioning product.

The cushioning conversion machines disclosed in the above-identified patents use a connecting assembly comprising a pair of loosely meshed gear-like members between which overlapping portions of the stock material layers pass. The loosely meshed gear-like members cooperate to stitch, as by coining, the overlapping portions thereby to connect the strip along the central portion of the product disposed between lateral pillow-like portions that primarily contribute to the cushioning properties of the product.

A secure stitching is desired to maintain the intactness of the pillow-like portions and thus the cushioning properties of the dunnage product. To this end, perforations heretofore have been provided in the connecting portion of the produced dunnage strip to aid the coined portions in preventing opening up or separation of the connected portions of the product, this commonly being referred to as "unzippering". The perforations were produced by projections extending radially outwardly from the teeth of at least one of the gear-like members. For further details, reference may be had to U.S. Pat. Nos. 4,937,131 and 4,968,291.

Although the connecting assemblies disclosed in the above-identified patents adequately perform their connecting and other functions, it would be desirable to have a stitching assembly that further facilitates and/or enhances the stitching of overlapped portions of sheet-like stock material forming a low density cushioning product, particularly when using heavier weight and/or stiffer stock material.

SUMMARY OF THE INVENTION

The present invention provides a connecting assembly for a cushioning conversion machine, a cushioning conversion machine including the connecting assembly, a method of forming a novel cushioning product that results from using the connecting assembly, and a new dunnage product. A preferred embodiment of the connecting assembly, also herein referred to as a stitching assembly, provides a unique interlock between overlapped portions of the sheet-like stock material to prevent "unzippering" of the low density cushioning product produced by the cushioning conversion machine.

In accordance with the invention, a novel stitching assembly for a cushioning conversion machine comprises a pair of rotatable stitching members. A first one of the stitching members has a plurality of radially outwardly extending projections around the circumference thereof, the projections having at least two axially spaced apart segments defining a recess therebetween. The other or second stitching member includes at least one axial segment, herein referred to as a punch segment, including a peripheral edge portion dimensioned to be received in the recess in the first stitching member during rotation of the stitching members, the peripheral edge portion being cooperative with the projections of the first stitching member to produce as by cutting at each corner edge thereof a row of slits in the overlapped portions of the sheet-like stock material, thereby forming at least one row of tabs for interlocking the overlapped portions of the stock material. Preferably, the second stitching member includes another axial segment relatively adjacent the punch segment, such other axial segment having a plurality of radially outwardly extending projections meshing with the projections of one of the axial segments of the first stitching member. The peripheral edge portion of the punch segment has punch portions aligned with the spaces circumferentially between the first projections of the other axial segment of the second stitching member, and the punch portions have edges cooperative with edges on the projections of the first stitching member to produce, preferably cut, a row of slits in the overlapped portions of the stock material.

In one preferred embodiment, the axial segments of the stitching members are provided with radial projections such as teeth, at least some of which mesh and others which move past one another during rotation of the stitching members to sever or slit tab portions out of the overlapped layers of stock material. In another preferred embodiment, the peripheral edge portion of the second stitching member is circumferentially continuous with the punch portions being formed by portions of the circumferentially continuous peripheral edge portion that span the circumferential space between the projections of the relatively adjacent segment or segments.

According to another aspect of the invention, the stitching members are formed by a plurality of flat disc members stacked side-by-side with the several axial segments being formed by one or more of the flat disc members. Some of the disc members have a toothed profile to form individually or collectively with one or more other like disks the sections having the radial projections, while one or more other disc members of smaller diameter function as spacers to axially space apart relatively adjacent toothed segments and thus form therebetween the recess in which the outer peripheral edge portion of the punch segment is received. The outer peripheral edge portion is formed by a larger diameter member, such as a circular or contoured disc, that is sandwiched between relatively adjacent toothed segments.

According to still another aspect of the invention, a dunnage product is formed from at least one layer of stock material having overlapped portions including a central row of outwardly directed dents alternating with inwardly directed dents, and at least one row of tabs adjacent the central row which are defined by laterally spaced apart severed or cut slits, the tabs being punched from the layer of stock material in a direction opposite the relatively adjacent dent of the central row.

Further in accordance with a preferred embodiment of the invention, a cushioning conversion machine for converting a sheet-like stock material into dunnage sections of a desired length comprises a frame having an upstream end and a downstream end; a forming assembly, mounted to the frame, which shapes the stock material into a continuous three dimensional strip of dunnage having overlapped portions of the stock material; a pulling/connecting assembly mounted to the frame downstream of the forming assembly including a pair of interacting rotating members, the first of the rotating members including a pulling axial section which pulls the stock material through the forming assembly and a connecting axial section which connects the overlapped portions of the stock material; a stock supply assembly, positioned upstream of the forming assembly, which supplies the stock material to the forming assembly; and a severing assembly, positioned downstream of the pulling connecting assembly, which severs the connected strip of dunnage into dunnage sections of a desired length.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
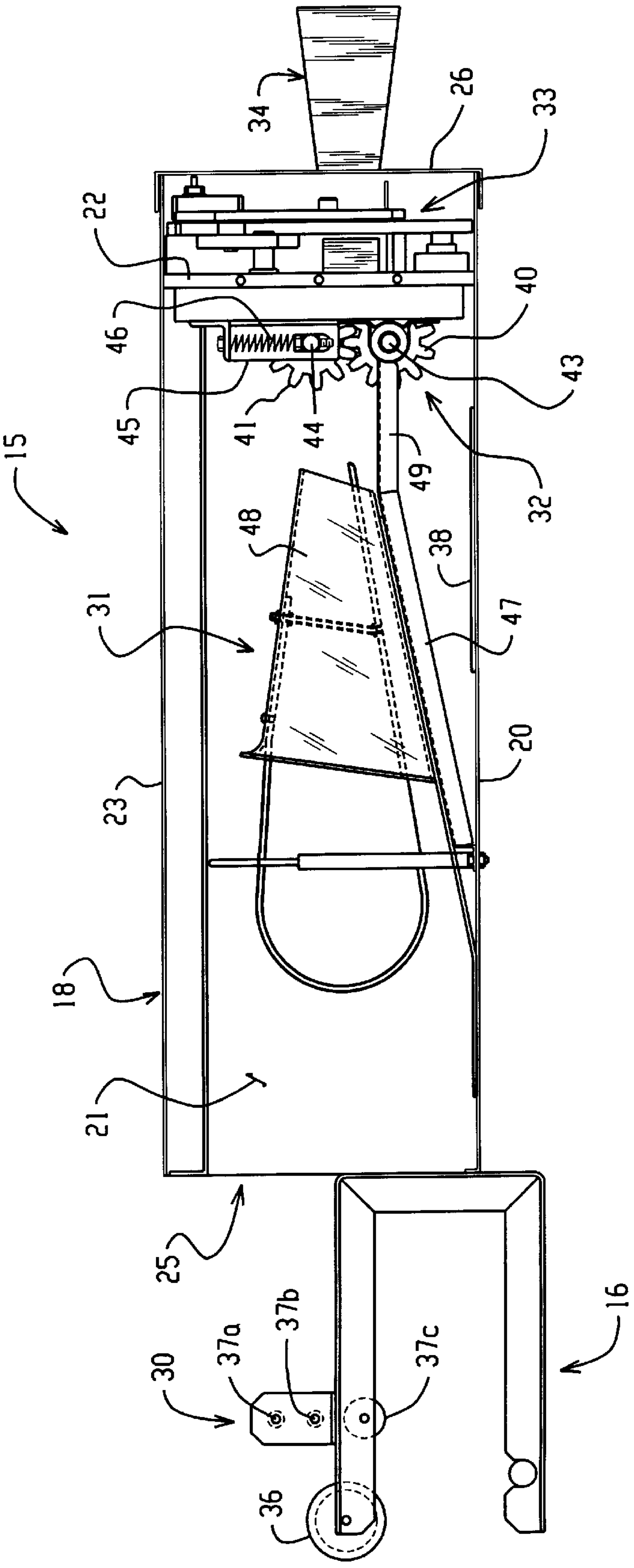
FIG. 1 is a side view of a cushioning conversion machine with a side panel of the machine's housing nearest the viewer removed to permit viewing of internal machine components.

Referring now to the drawings in detail, and initially to FIG. 1, a cushioning conversion machine 15 according to the present invention is illustrated. The machine 15 has at its upstream end (to the left in FIG. 1) a holder 16 for a supply, such as a roll or rolls, of sheet-like stock material. The stock material preferably consists of three superimposed plies or layers of biodegradable, recyclable and reusable thirty-pound Kraft paper rolled onto a hollow cylindrical tube. The illustrated exemplary machine 15 converts the stock material into a continuous unconnected strip having lateral pillow-like portions separated by a thin central band. This strip is connected along its central band to form a coined strip of cushioning product that may be severed, as by cutting, into sections, or pads, of a desired length.

The machine 15 includes a housing 18 having a base plate or wall 20, side plates or walls 21, and an end plate or wall 22 which collectively form a frame structure. The base wall 20 is generally planar and rectangular in shape. The housing also includes a top wall 23, which together with the base, side and end walls, form an enclosure.

The base and side walls 20 and 21 have at the upstream end of the housing inturned edge portions forming a rectangular border around a centrally located, and relatively large, rectangular stock inlet opening 25. This border may be viewed as an end plate or wall extending perpendicularly from the upstream edge of the base wall 20. It should be noted that the terms "upstream" and "downstream" are herein used in relation to the direction of flow of the stock material through the machine 15. The end plate 22 extends perpendicularly from a location near, but inward from, the downstream end of the base wall 20. The end plate 22 is generally rectangular and planar and includes a dunnage outlet opening.

The housing (or frame) 18 also includes a front cover or plate 26 which extends perpendicularly from the downstream edge of the base wall 20. Thus, the end plate 22 and front plate 26 bound upstream and downstream ends of a box-like extended portion of the downstream end of the housing 18. The front plate 26 may be a door-like structure which may be selectively opened to access severing assembly components of the cushioning conversion machine 15.

The machine 15 further includes a stock supply assembly 30, a forming assembly 31, a feed/connecting assembly 32 powered by a stitching member drive motor, for example an electric motor (not shown), a severing assembly 33 powered by a severing motor, for example an electric motor (not shown), and a post-cutting or severing guide assembly 34. The stock supply assembly 30, including a constant entry roller 36 and separators 37*a*–37–*c*, is mounted to an upstream side of the housing 18 or more particularly the upstream end plate or wall. The forming assembly 31 is located downstream of the stock supply assembly 30 interiorly of the housing and functions to form the stock material into a continuous three-dimensional strip of dunnage having portions of the stock material overlapped along the central region of the strip. The feed/connecting assembly 32 is located downstream of the forming assembly 31 and is mounted on an upstream side of the downstream end plate 22. On the opposite or downstream side of the downstream end plate 22, the severing or cutting assembly 33 is mounted. The motors are preferably mounted on the base wall 20 which may be provided with a transverse mounting plate 38 which forms part of the base wall or plate 20. The motors are disposed on opposite sides of the forming assembly 31. The post-cutting assembly 34 is located downstream of the severing assembly 33 and it is mounted on the front cover 26. Reference may be had to U.S. patent application Ser. No. 08/386,355 filed Feb. 8, 1995, now abandoned, for a severing assembly similar to that illustrated, or to U.S. patent application Ser. No. 08/110,349 filed Aug. 20, 1998, pending for another type of severing assembly.

The feed/connecting assembly 32 in the illustrated machine performs two functions. The feed/connecting assembly connects the overlapped portions of the stock material to maintain the three-dimensional shape of the strip of dunnage. The feed/connecting assembly also functions to feed stock material through the machine, as by pulling the stock material from the stock supply assembly and through the forming assembly:y 31. These dual functions are carried out by a pair of rotating stitching members and particularly gear-like members 40 and 41 described in greater detail below. In the illustrated embodiment by which the present invention is exemplified, one of the gear-like members 40 is mounted on a shaft 43 rotatably driven by the feed motor whereas the other is an idler carried on a floating shaft 44. The driven gear-like member 40 rotates about an axis fixed with respect to the front plate 22 whereas the other is carried on the floating shaft which is guided by guide slots in guides 45 for parallel translating movement toward and away from the driven shaft 43. The floating shaft, and thus the floating gear-like member, is resiliently biased by a spring 46 or other suitable resilient biasing means towards the driven gear-like member. The spring force may be adjusted to vary the squeeze force applied by the gear-like members to the strip of stock material passing therebetween from the forming assembly to the severing assembly.

In operation of the machine 15, the stock supply assembly 30 supplies stock material to the forming assembly 31. The forming assembly 31 causes inward rolling and shaping of the sheet-like stock material to form lateral pillow-like portions of a continuous strip of cushioning. The feed/connecting assembly 32 advances the stock material through the machine and also connects the central band to form a connected dunnage strip. As the connected dunnage strip travels downstream from the feed/connecting assembly 32, the severing assembly 33 severs or cuts the dunnage strip into sections, or pads, of a desired length. The severed or cut pads then travel through the post-severing assembly 34.

The machine 15 as thus far described is generally the same as the machine described in greater detail in U.S. Pat. No. 5,123,889 (hereby incorporated herein by reference) and reference may be had thereto for further details of the general arrangement and operation of the machine. However, it is noted that the illustrated forming assembly 31 is of the type described in pending U.S. patent application Ser. No. 08/386,355 filed Feb. 8, 1995, now abandoned which is hereby incorporated by reference. Also, the forming assembly is provided with a guide ramp 47 to which a shaping chute 48 is mounted, the guide ramp having an extended guide surface portion 49 extending from the downstream end of the shaping chute into close proximity to the gear-like members 40 and 41.

Figure 3:
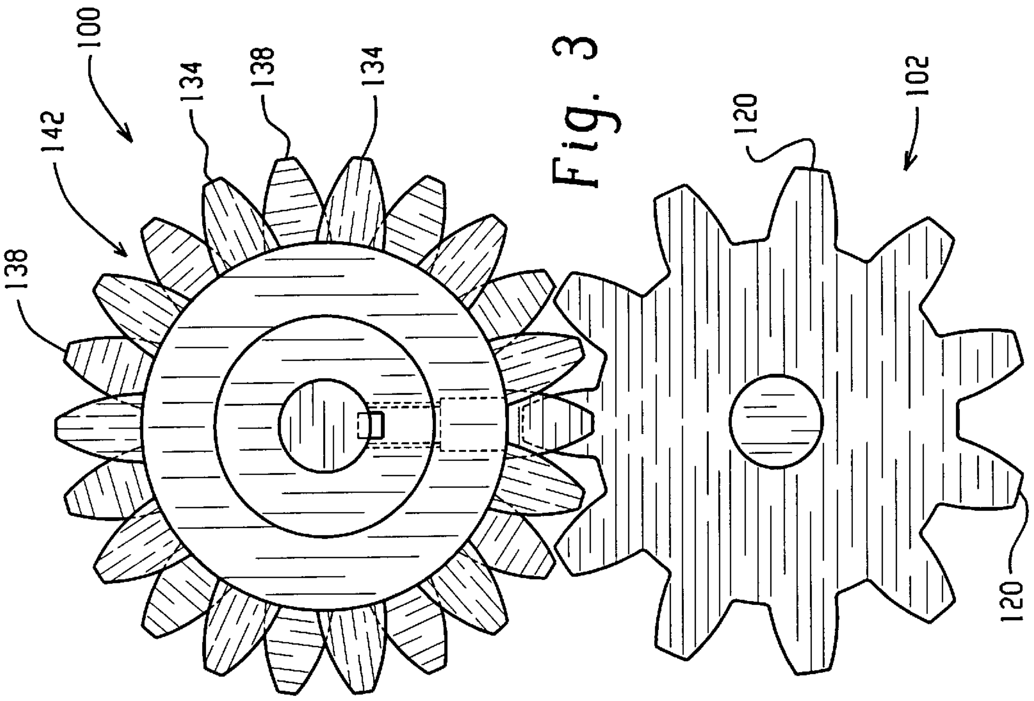
FIG. 3 is a side view of the stitching members of FIG. 2.
Figure 2:
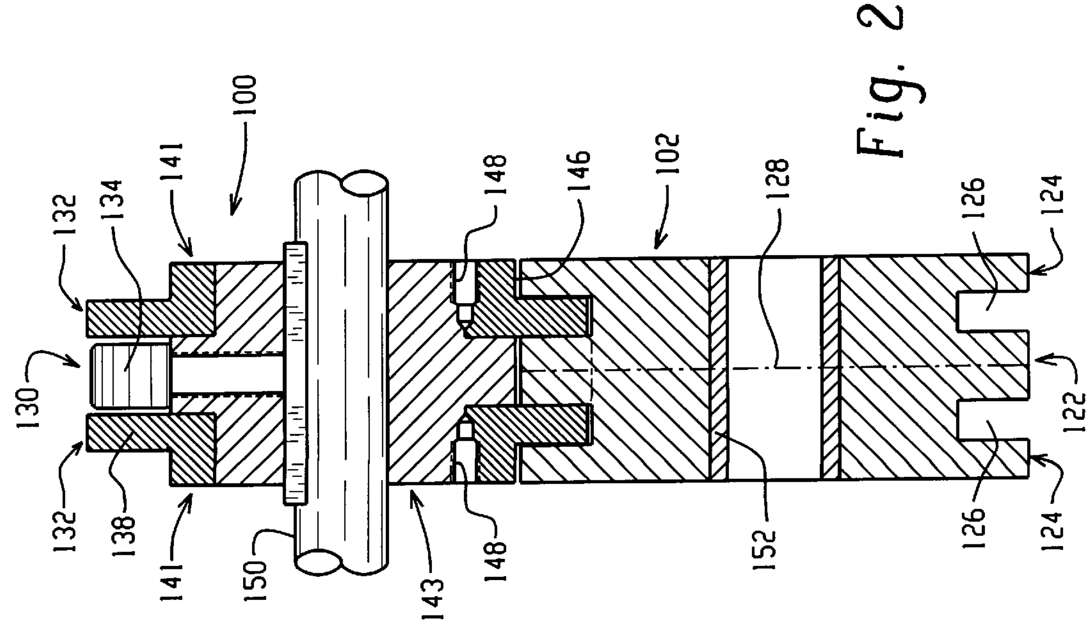
FIG. 2 is a sectional view through one embodiment of male and female stitching members useful in the machine of FIG. 1.

The present invention provides stitching members and particularly gear-like members for replacing the presently known gear-like members, the new gear-like members performing a superior connecting function. Referring to FIGS. 2 and 3, details of the gears 100 and 102 can be seen. Although particularly useful in the above described machine, the gears may be used in place of the presently known gears (gear-like members) in other conversion machines. It is noted that the new gear-like members may be used to perform both the stitching and feed functions previously performed by presently known gear-like members, or just the stitching function while other means are provided to perform the feed function, such as one or more feed assemblies for pushing and/or pulling the stock material through the machine and/or sub-components thereof.

The gear 102, herein also called the female stitching gear or wheel, has around the circumference thereof a plurality of radially outwardly extending projections 120 preferably in the form of teeth, such as the illustrated spur gear teeth. The teeth 120 are divided into a central segment 122 and outer or side segments 124 by annular recesses or grooves 126. The segments and grooves preferably are symmetrically disposed with respect to the center plane 128 of the female gear.

The other gear 100, herein also referred to as the male stitching gear or wheel, includes a central segment 130 and axially adjacent side segments 132 herein referred to as punch or perforating segments. The central segment 130 has around the circumference thereof a plurality of radially outwardly extending projections 134, preferably teeth such as the illustrated spur gear teeth, meshing with the teeth 120 of the central segment 122 of the female stitching gear 102. The punch segments 132 each have around the circumference thereof a plurality of radially outwardly extending projections 138 having a width slightly less than the width of the respective grooves 126 in the female gear and thus dimensioned to be received in the annular grooves during rotation of the stitching gears. The projections 138 on the punch segments 132 have the same pitch as the teeth 134 of the central segment 130, but are offset circumferentially by one half pitch, whereby they are aligned with the spaces or valleys 142 between the teeth 134 of the central segment 130 that receive the teeth 120 of the female gear during rotation of the gears. Consequently, during rotation of the gears, the projections 138 (or punches) will move past the synchronously moving teeth of the female stitching gear.

For easy fabrication of the male gear 100, the punch segments 132 may be formed on disc inserts 141attached to a main gear body 143 including the central segment 130, as shown. The punch segments have axially extended hubs 146 fitted over axial hub projections at respective sides of the main gear body, with threaded holes 148 being provided for receiving set screws which lock the inserts against rotation relative to the main gear portion. As also shown, the male gear is keyed to the driven shaft 150 and the female gear may have a bushing 152 in a centerbore thereof for rotating on its shaft. The hubs 146 have an outer diameter equal the diameter of the base circle of the teeth 134.

The edges of the punch segment projections 138 (or at least the leading edges) preferably form with the sides thereof sharp corners which function as cutting or knife edges. Similarly, the edges (at least the leading edges) of the teeth 120 of the female gear 102 adjacent the annular grooves 126 form sharp corners with the side walls of the grooves, also to function as a cutting or knife edges in cooperative relationship with the cutting edges of the punch segment projections.

As should now be evident, the gears 100 and 102 will rotate synchronously because of the meshed central segments of the gears which are about equal in width. The meshing gears pull the overlapped lateral edge portions of the stock material therebetween and while doing so will form dents or indentations in the stock material and thus thereby coin the stock material. At the same time, the punch segment projections will move past the teeth of the female gear. At the nip of the gear, the then juxtaposed punch segment projection 138 and female gear tooth 120 will cause the portions of the stock material radially outwardly thereof to move in opposite directions while the cutting edges cooperate to create a shearing action forming a slit through each one of the overlapped layers at each side of a thus formed tab portion being punched by the punch segment projection. To prevent tearing of the stock material other than at the slits, the several projections may be rounded at their radially outer ends.

Figure 4:
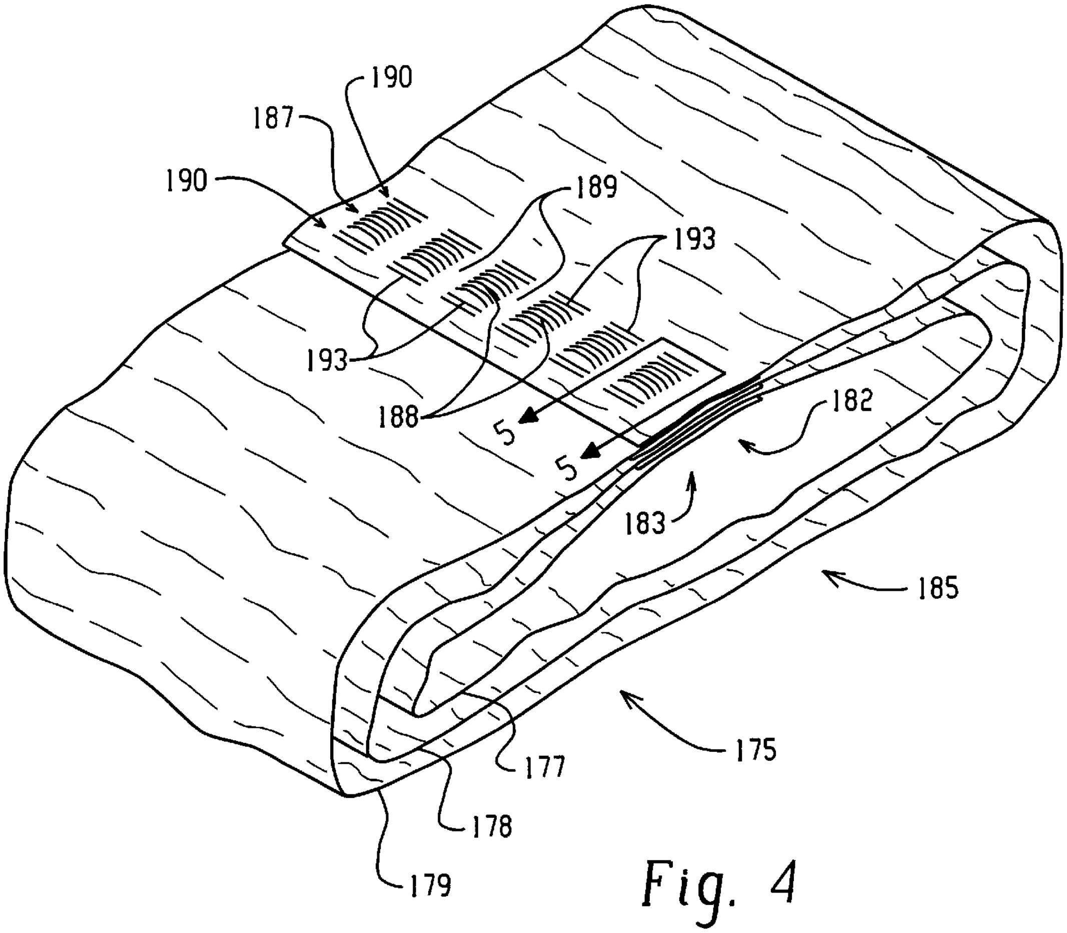
FIG. 4 is a schematic illustration of a cushioning product having a central band thereof connected by the stitching members of FIG. 2.
Figure 5:
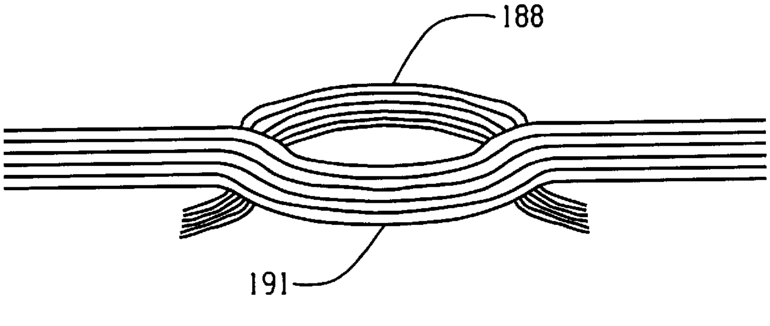
FIG. 5 is a cross-sectional view taken along the line 5—5 of FIG. 4.

Referring now to FIGS. 4 and 5, a cushioning product according to the invention is schematically illustrated at 175. The cushioning product comprises at least two and preferably three, or more, layers 177–179 of sheet-like material having lateral edge portions thereof folded over the center portions and interleaved as seen at 182. The overlapped and interleaved lateral edge portions 182 are stitched together along a central seam or band 183 separate from the central portions 185 of the layers which are crumpled and provide loft to the cushioning product. The overlapped lateral edge portions 182 are generally coplanar with adjacent unoverlapped portions of the first layer, and the layers of stock material comprise biodegradable, recyclable and reusable Kraft paper, as above mentioned.

As shown, the stitching pattern produced by the stitching gears includes a central row 187 of outwardly directed dents 188 alternating with inwardly directed dents 189. The central row of dents is bounded at each side thereof by a row 190 of tabs 191. The tabs, which are defined by laterally spaced apart slits 193, are dented or punched from the layer of stock material in a direction opposite the relatively adjacent dent of the central row.

Referring now to FIGS. 6A–C and 7A–C, a further embodiment of stitching members according to the invention is exemplified by the gear-like members or gears 200 and 202. Although particularly useful in the above described machine, the gears 200 and 202 may be used in place of the presently known gears (gear-like members in other conversion machines) or the aforedescribed gears 100 and 102. It is again noted that the new gear-like members 200 and 202 may be used to perform both the stitching and feed functions previously performed by presently known gear-like members, or just the stitching function while other means are provided to perform the feed function, such as one or more feed assemblies for pushing and/or pulling the stock material through the machine and/or sub-components thereof.

Figure 6C:
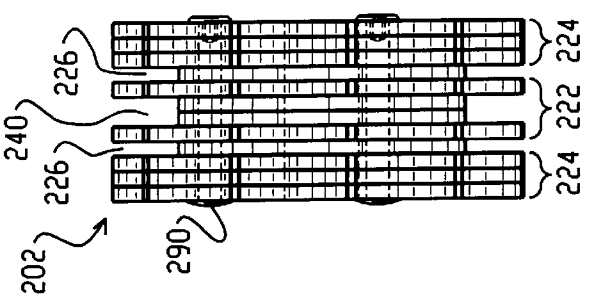
FIG. 6C is an edge view of the female stitching member of FIG. 6A.
Figure 6B:
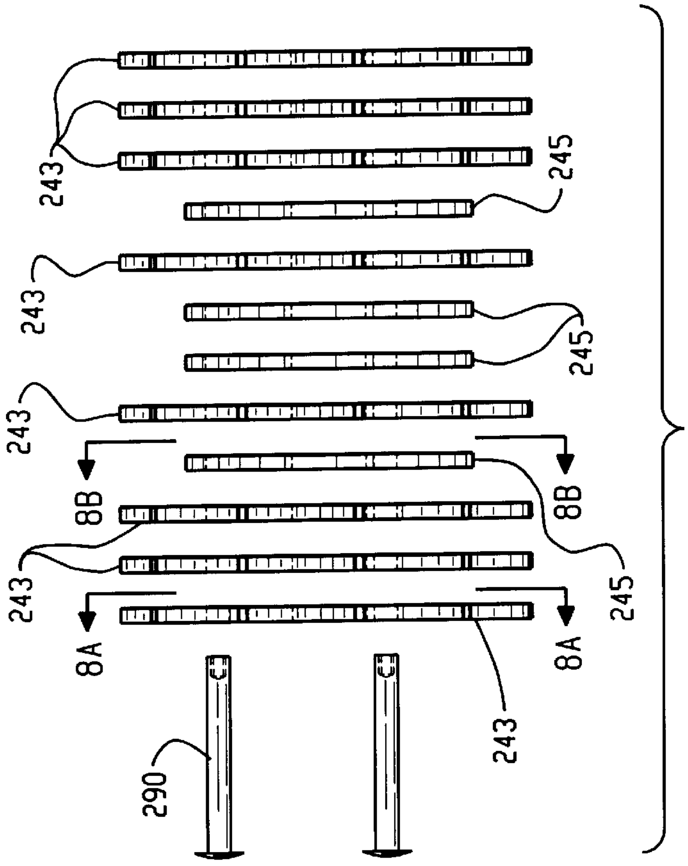
FIG. 6B is an exploded edge view of the female stitching member of FIG. 6A.
Figure 6A:
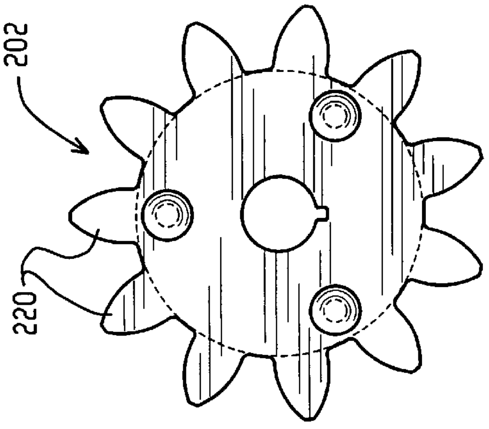
FIG. 6A is a side view of another embodiment of female stitching member according to the invention.

As seen in FIGS. 6A–6C, the gear 202, herein also called the female stitching gear or wheel, has around the circumference thereof a plurality of radially outwardly extending projections 220 preferably in the form of teeth, such as the illustrated spur gear teeth. The teeth 220 are divided into a central segment 222 and outer or side segments 224 by annular recesses or grooves 226. The axial segments and grooves (or groove segments) preferably are symmetrically disposed with respect to the center plane of the female gear.

The other gear 200, herein also referred to as the male stitching gear or wheel, includes a central segment 230, axially adjacent inner side segments 232 herein referred to as punch or perforating segments, and outer side segments 233 respectively outwardly adjacent the inner side segments 232. The central segment 230 and outer side segments 233 have around the circumference thereof a plurality of radially outwardly extending projections 234, preferably teeth such as the illustrated spur gear teeth, for meshing with the teeth 220 of the central segment 222 and outer side segments 224 of the female stitching gear 202 (FIGS. 6A–C). Each punch segment 232 has a radially outer circumferential or peripheral edge portion 237 having a width slightly less than the width of the respective grooves 226 in the female gear 202 (FIGS. 6A–C) and thus dimensioned to be received in the annular grooves 226 during rotation of the stitching gears. As seen in FIG. 7A, the peripheral edge portion 237 has portions 238 thereof that overlap or are aligned with the spaces or valleys 242 between the teeth 234 of the central segment 230 that receive the teeth 220 of the female gear 202 (FIGS. 6A–C) during rotation of the gears. Consequently, during rotation of the gears, the portions 238 (or punches) will move past the synchronously moving teeth of the female stitching gear. As is preferred, the center toothed segment 230 of the male gear 200 and the center toothed segment 222 of the female gear 202 have respective centrally located annular grooves 239 and 240 that are aligned with one another and preferably of equal width. These grooves function to reduce the overall load bearing surface areas of the gears to utilize the pressure of the biasing springs 46 (FIG. 1) more effectively, the spring loading acting on the stock material being more concentrated at the surface areas of the gears which operate to deform the sheet material to provide a higher force per unit area.

As seen in FIG. 7A, the teeth 234 preferably project radially outwardly beyond the outer edge of the peripheral edge portion 237; conversely the radially outer edge of the peripheral edge portion is spaced radially outwardly from the radially outer ends of the teeth. Furthermore, the circumferential area between relatively adjacent teeth 234 (measured radially outwardly of the root circle of the teeth) is only partially overlapped by the peripheral edge portion of the punch segment, as by approximately 10–90% of the area and more preferably by approximately 50–80%. If the radially outward extent of the peripheral edge portion is too small, such as equal the root circle, then no slitting will occur. If the radially outward extent of the peripheral edge portion is too great, such as equal the radial extent of the teeth, continuous slits would be formed. It also is noted that in the stitching gears shown in FIGS. 2 and 3, the punch forming portions thereof in the form of teeth-like projections 138 may project radially outwardly to the same extent as the teeth 134. However, the circumferential area between relatively adjacent teeth 134 is only partially overlapped by the projections 138.

For ease in fabrication, the gears 200 and 202 preferably are formed by a stack of axially juxtaposed disc members preferably having a thickness that enables the disc members to be economically formed, for example by stamping or laser cutting from sheets or plates, typically of steel although other suitable materials (typically metal) may be employed as desired. The preferred gears illustrated in FIGS. 6A–C and FIGS. 7A–C are composed of essentially five different flat disc members 243–247 all preferably having about the same uniform thickness, except for slight variations necessary to accommodate mating disc members and grooves between disc members. However, a different number disc members, which may be of significantly different thicknesses, may be used. For example, a single thicker disc member may be used in place of multiple disc members forming a single axial segment, if desired.

Figure 8A:
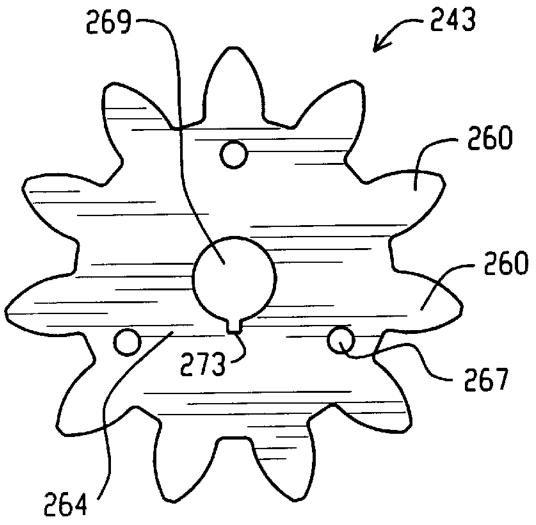
FIG. 8A is a view of a representative one of the toothed flat disc members forming a part of the female stitching member of FIG. 6A, taken from the line 8A—8A of FIG. 6B.
Figure 8B:
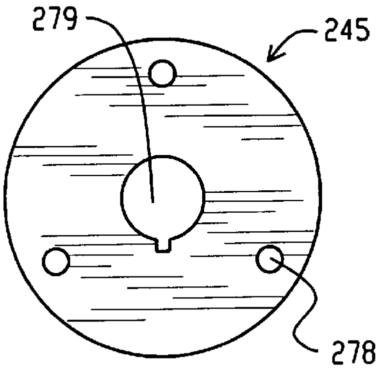
FIG. 8B is a view of a representative one of the small diameter circular flat disc members forming a part of the female stitching member of FIG. 6A, taken from the line 8B—8B of FIG. 6B.
Figure 9A:
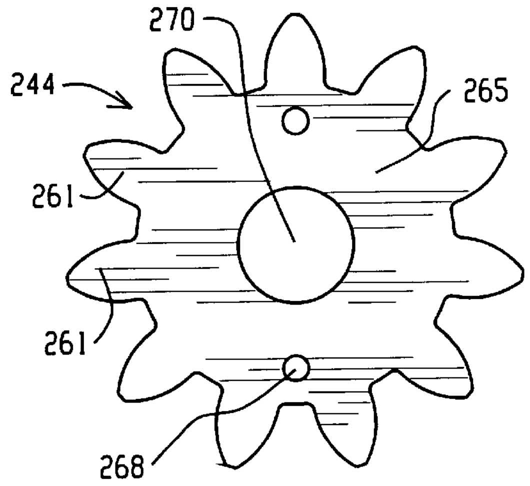
FIG. 9A is a view of a representative one of the toothed flat disc members forming a part of the male stitching member of FIG. 7A, taken from the line 9A—9A of FIG. 7B.
Figure 9B:
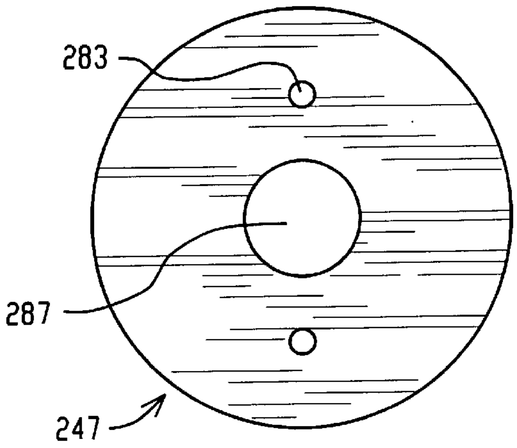
FIG. 9B is a view of a representative one of the large diameter circular flat disc members forming a part of the male stitching member of FIG. 7A, taken from the line 9B—9B of FIG. 7B.
Figure 9C:
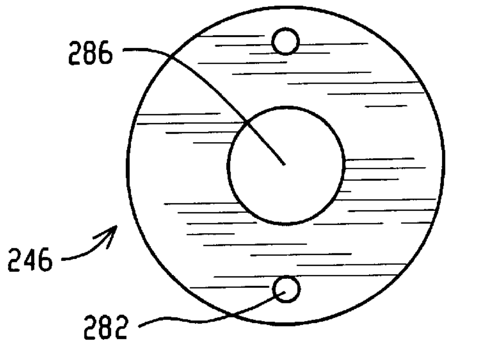
FIG. 9C is a view of a representative one of the smaller diameter circular flat disc members forming a part of the male stitching member of FIG. 7A, taken from the line 9C—9C of FIG. 7B.

The disc members 243 and 244 have the cross-section of a spur gear as shown in FIGS. 8A and 9A, the teeth 260 and 261 thereof extending radially outwardly from respective hubs 264 and 265 to form circumferentially spaced apart projections. The disc members 243 and 244 have one or more holes 267 and 268, respectively, for connecting pins and a center hole 269 and 270, respectively, for mounting to a shaft. As shown, the disc member 243 used to form the female gear 202, which is the driven gear, has three circumferentially equally spaced apart holes 267 in the hub 264 thereof for the connecting pins, and a center hole 269 that has a key slot 273 for accommodating a key on a drive shaft. The other disc member 244 is used to form the male gear 202 may have, for example, two diametrically opposite connecting pin holes 268 and no key slot if not driven as in the illustrated preferred embodiment. Aside from the connecting holes and center holes, the disc members preferably are otherwise identical (size and shape).

The disc members 245–247 are preferably circular discs, the disc members 245 and 246 preferably being of the same diameter and preferably a diameter equal the diameter of the hub 264/265 from which the projections or teeth 260/261 of the disc members 243/244 extend radially outwardly. The disc member 247 has a diameter larger than the diameter of the disc members 245 and 246. The disc member 245, used to form the female gear 202, has connecting holes 278 and a keyed center hole 279 like the toothed disc member 243. Similarly, the disc members 246/247, used to form the male gear, have connecting holes 282/283 and a center hole 286/287 like in the toothed disc member 244.

Eight toothed disc members 243 and four small diameter circular disc members 245 are assembled together to form the female gear as shown in FIGS. 6B and 6C. Three toothed disc members 243 (FIG. 8A) are stacked together with the teeth thereof aligned with one another to form each outer side segment 224. The center segment 222 is formed by two smaller circular disc members 245 sandwiched between two toothed disc members 243 that have the teeth thereof aligned with one another and with the teeth of the outer disc segments 224. The smaller circular disc members 245 space the toothed gear members 245 apart and thus form the annular center groove 240 therebetween. Each side segment 224 is spaced from the center segment 222 by a small diameter disc member 243 which thereby forms the annular groove or groove segment 246 between the center and outer segments. The disc members are held together by connecting members 290, such as rivets or pins extending through the holes 267/278 in the disc members 243/245 which are axially aligned to receive the connecting rivets. Other suitable means may be employed to secure the disc members together. For example the disc members may be welded together and/or to a supporting shaft.

Figure 7C:
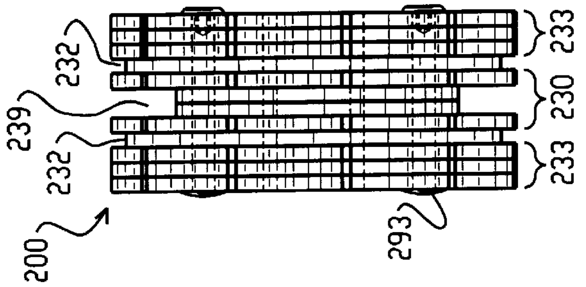
FIG. 7C is an edge view of the male stitching member of FIG. 7A.
Figure 7B:
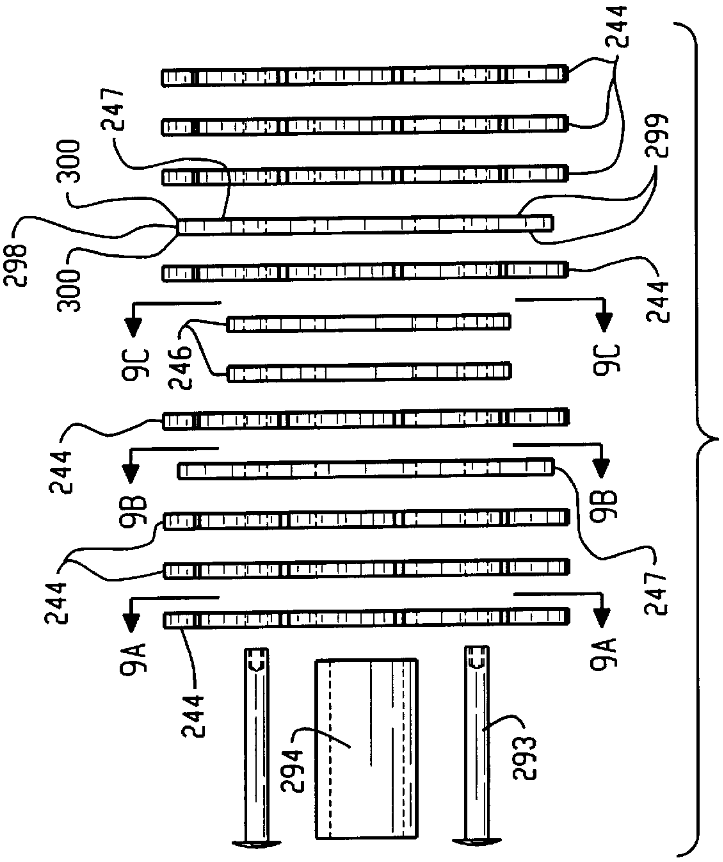
FIG. 7B is an exploded edge view of the male stitching member of FIG. 7A.
Figure 7A:
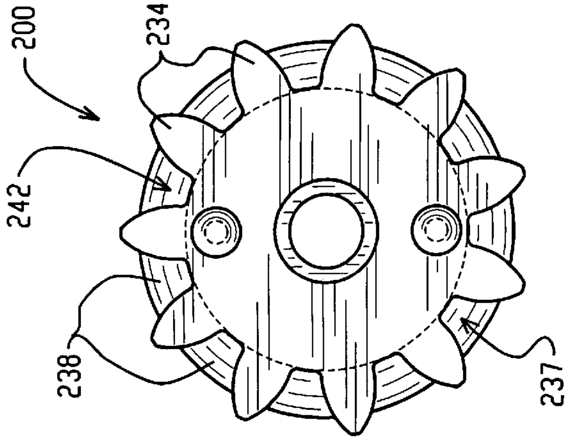
FIG. 7A is a side view of another embodiment of male stitching member according to the invention, useful with the female stitching member of FIG. 6A.

Eight toothed disc members 244, two small diameter circular disc members 246 and two large diameter disc members 247 are assembled together to form the male gear 200 as shown in FIGS. 7B and 7C. Three toothed disc members 244 are stacked together with the teeth thereof aligned with one another to form each outer side segment 233. The center segment 230 is formed by two smaller circular disc members 246 sandwiched between two toothed disc members 244 that have the teeth thereof aligned with one another and with the teeth of the outer disc segments 233. The smaller circular disc members 246 space the toothed gear members 244 apart and thus form the annular center groove 239 therebetween. Each side segment 233 is spaced from the center segment 230 by a large diameter disc member 247 which thereby forms the punching segment 232 between the center and outer segments. The disc members are held together by connecting members 293, such as rivets or pins, extending through the holes in the disc members which are aligned to receive the connecting rivets. Again, other suitable means may be employed to secure the disc members together, for example welding. A bushing 294 may extend through the center holes 270/286/287 of the disc members as shown.

The outer edge 298 of each punch disc member 247 preferably forms with the side surfaces 299 thereof sharp edge corners 300 which function as cutting or knife edges. Similarly, the edges (at least the leading edges) of the teeth 220 of the female gear 202 (FIGS. 6A–C) adjacent the annular grooves 226 form sharp edge corners with the side walls of the grooves, also to function as cutting or knife edges in cooperative relationship with the cutting edges 300 of the punch segment projections 238 (FIG. 7A).

As should now be evident, the gears 200 and 202 will rotate synchronously because of the meshed central and outer segments of the gears. The meshing gears pull the overlapped lateral edge portions of the stock material therebetween and while doing so will form dents or indentations in the stock material and-thus thereby coin (mechanically permanently deform) the stock material. At the same time, the punch portions 238 (FIG. 7A) spanning the teeth 234 (FIG. 7A) of the adjacent toothed sections will move past the teeth 220 (FIG. 6A) of the female gear. At the nip of the gears, the then juxtaposed punch portions and female gear teeth will cause adjacent portions of the stock material to move in opposite directions while the cutting edges cooperate to create a shearing action forming a slit through each one of the overlapped layers at each side of a thus formed smooth-edged tab portion being punched by the punch segment projection. As is apparent from the foregoing description, "punching" includes cutting the slits to form the tabs.

Figure 10:
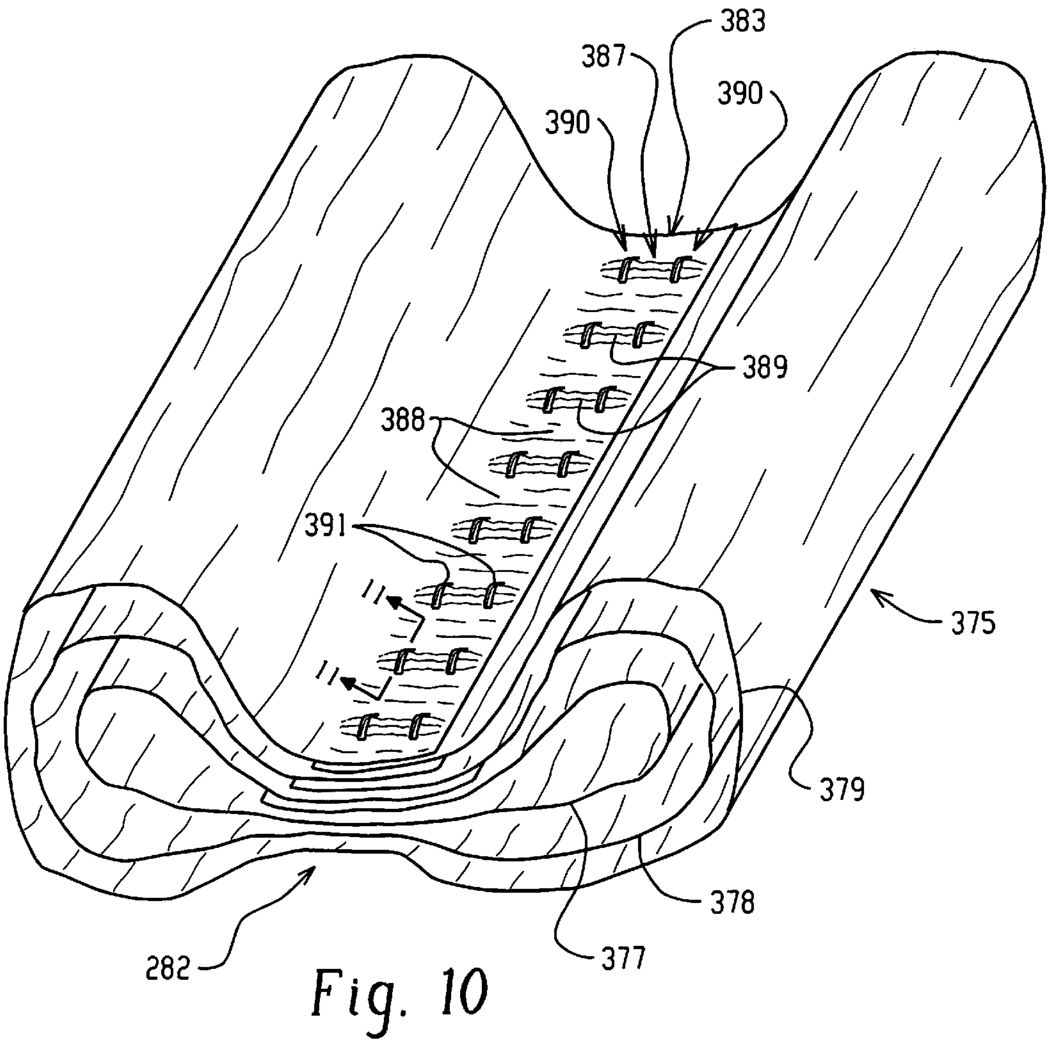
FIG. 10 is a schematic illustration of a cushioning product having a central band thereof connected by the stitching members of FIGS. 6A and 7A.
Figure 11:
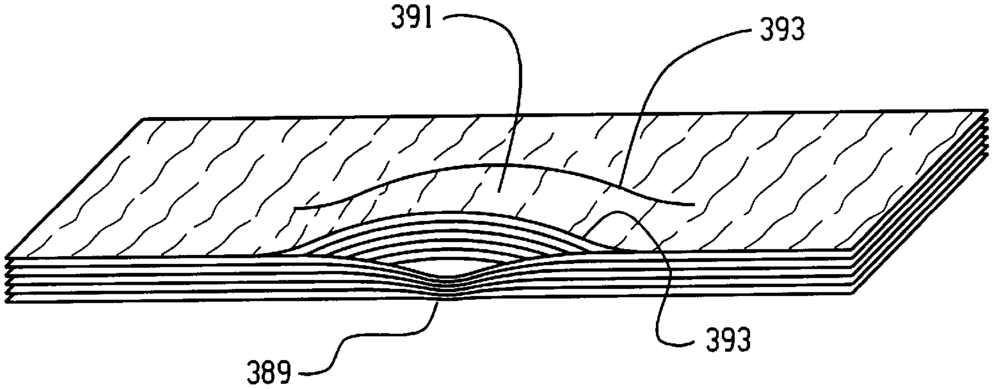
FIG. 11 is a cross-sectional view taken along the line 11—11 of FIG. 10.

Referring now to FIGS. 10 and 11, a cushioning product according to the invention is schematically illustrated at 375. The cushioning product comprises at least two and preferably three, or more, layers (plies) 377–379 of sheet-like material having lateral edge portions thereof folded over the center portions and interleaved and/or overlapped as seen at 382. The overlapped and interleaved portions 382 are stitched together along a central seam or band 383.

As shown, the stitching pattern produced by the stitching gears includes a central row 387 of outwardly directed dents 388 alternating with a inwardly directed dents 389. The central row of dents is bounded at each side thereof by a row 390 of tabs 391. The tabs, which are defined by laterally spaced apart slits 393, are dented or punched from the layer of stock material in a direction opposite the relatively adjacent dent of the central row.

As will be appreciated, the disc members that make up the gears 200 and 202 may be assembled in different patterns as may be desired for a particular application. For example, the outer side segments of the stitching gears may be composed of a single toothed disc member, as might be desired for forming a smaller width stitching. Conversely, the number of toothed disc members may be increased to provide a wider segment or segments. Similarly, the number of spacer disc members and punch disc members may be varied to impart different features to the resultant strip of cushioning.

Figure 12C:
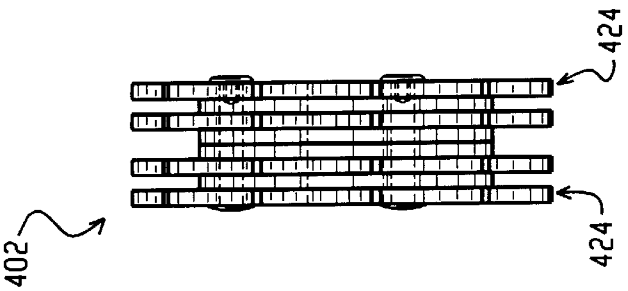
FIG. 12C is an edge view of the female stitching member of FIG. 12A.
Figure 12B:
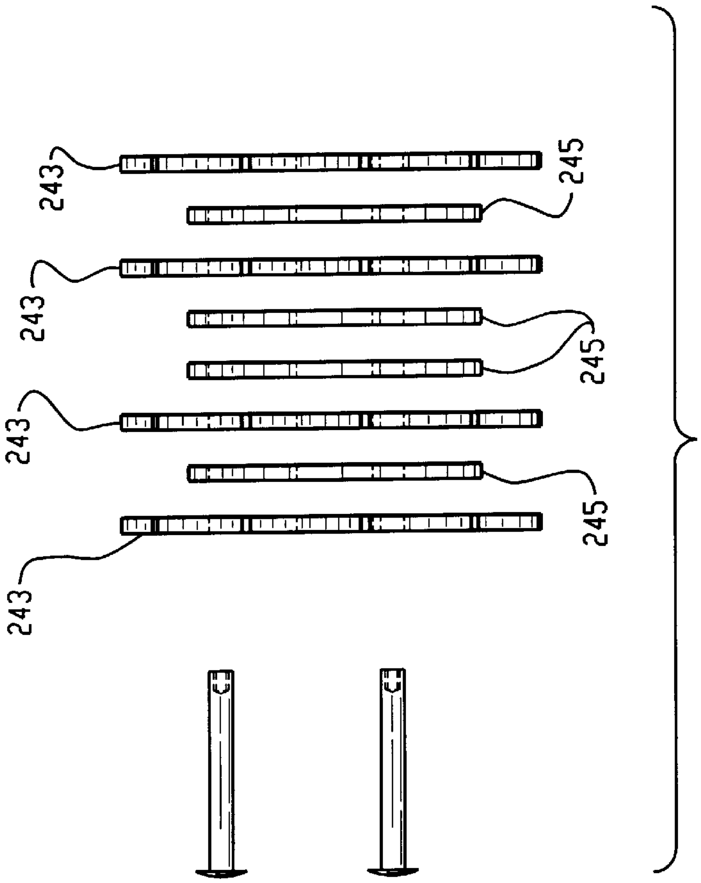
FIG. 12B is an exploded edge view of the female stitching member of FIG. 12A.
Figure 12A:
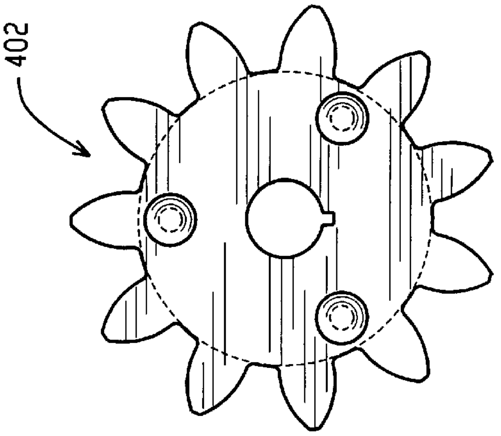
FIG. 12A is a side view of still another embodiment of female stitching member according to the invention, particularly useful in assembling relatively narrow width cushioning products.
Figure 13C:
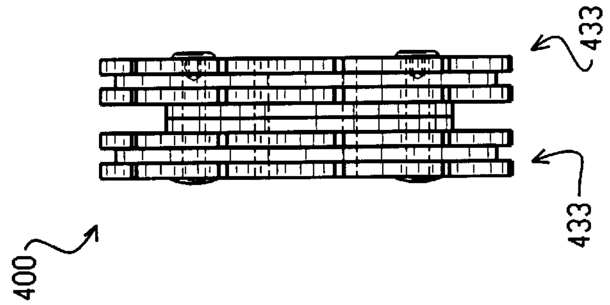
FIG. 13C is an edge view of the male stitching member of FIG. 13A.
Figure 13B:
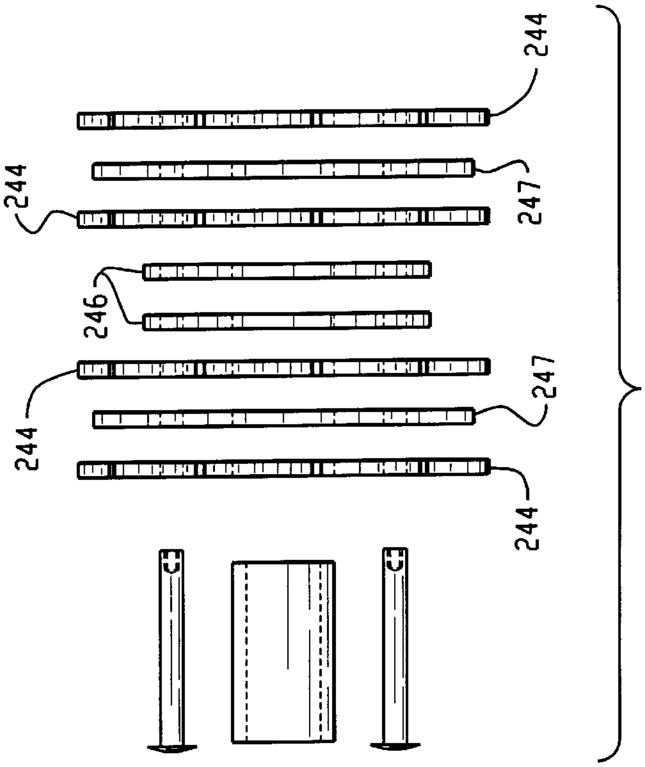
FIG. 13B is an exploded edge view of the male stitching member of FIG. 13A.
Figure 13A:
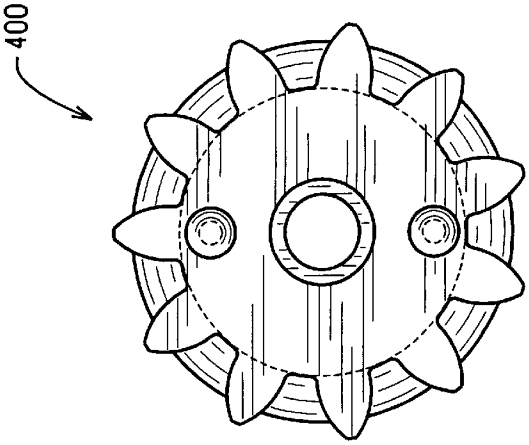
FIG. 13A is a side view of still another embodiment of male stitching member according to the invention, useful with the female stitching member of FIG. 12A.

In FIGS. 12 and 13, there are shown gears 400 and 402 that are particularly suited for use in assembling a relatively narrow width cushioning product, such as that produced in accordance with U.S. Pat. Nos. 4,884,999, 5,061,543 and 5,188,581, all of which are hereby incorporated herein by reference in their entireties. In pending U.S. patent application No. 08/410,048 filed Dec. 16, 1997 pending, which is also incorporated herein by reference in its entirety, there is disclosed still another arrangement particularly suited for forming a relatively narrow width cushioning product having, for example, a width of about four inches (10 cm). The gears 400 and 402 are identical to the aforesaid gears 200 and 202, except that the outer side segments 433/424 of the stitching gears 400/402 are composed of a single toothed disc member 244/243, as might be desired for forming a smaller width stitching. Accordingly, the gears 400 and 402 each have a pair of laterally spaced apart stitching sections (spaced by the spacer discs 246/245) with each stitching section consisting of two toothed disc members 244/243 spaced apart by an intermediate disc member 247/245 of lesser radial dimension. The overall width of the each gear is about 1 inch (2.54 cm), this being a preferred maximum width for use in forming cushioning product having a width less than about 5 inches (13 cm) and more particularly less than about 4 inches (10 cm).

Although details of the method of forming the dunnage product according to the invention have been mentioned above in connection with the description of the structure of the machine, by way of summary a method according to the invention comprises the steps of shaping plural layers of the stock material into a tube with the lateral edge portions being brought into overlapping relationship and connecting the overlapped lateral edge portions as above described. Preferably, the layers of stock material comprise biodegradable, recyclable and reusable Kraft paper.

In regard to the various functions performed by the above described assemblies and components thereof, the terms (including a reference to a "means") used to identify the herein-described assemblies and devices are intended to correspond, unless otherwise indicated, to any assembly/device which performs the specified function of such an assembly/device, that is functionally equivalent even though not structurally equivalent to the disclosed structure which performs the function in the illustrated exemplary embodiment of the invention.

While a particular feature of the invention may have been described above with respect to only one of the illustrated embodiments, such feature may be combined with one or more other features of the other embodiments, as may be desired and advantageous for any given or particular application.

Although the invention has been shown and described with respect to certain preferred embodiments, it is obvious that equivalent alterations and modifications will occur to others skilled in the art upon the reading and understanding of this specification. For example, the stitching gears may be used in other types of machines and methods to stitch overlapped portions of one or more layers of stock material. The present invention includes all such equivalent alterations and modifications.

What is claimed is:

1. A dunnage product formed from at least one layer of stock material having overlapped portions, the overlapped portions including a row of outwardly directed dents alternating with inwardly directed dents, and at least one row of tabs adjacent said row of dents, said tabs being defined by laterally spaced-apart smooth-edge slits and being punched from the layer of stock material in a direction opposite the relatively adjacent dent of the row of dents, the tabs having opposite ends thereof connected to relatively adjacent portions of the stock material.

2. A dunnage product as set forth in claim 1, wherein said at least one row of tabs includes two rows of tabs that are laterally spaced apart.

3. A dunnage product as set forth in claim 2, wherein the tabs in each row of tabs are laterally aligned with respective tabs in another row of tabs.

4. A method of forming a dunnage product from at least one layer of sheet-like stock material having overlapped portions, comprising the steps of:

forming in overlapped portions of the sheet-like stock material a central row of outwardly directed dents alternating with inwardly directed dents, and forming from the overlapped portions at least one row of tabs in a direction opposite the relatively adjacent dent of the row of dents, said tabs being defined by laterally spaced-apart smooth-edge slits, with opposite ends of the tabs being connected to relatively adjacent portions of the stock material.

5. A method as set forth in claim 4, including the step of supplying as the stock material a material that is biodegradable, recyclable and composed of a renewable resource.

6. A dunnage product formed by the method of claim 4.

7. A dunnage product formed from one or more layers of stock material comprising a lateral pillow portion and a connecting portion which maintains the geometry of the pillow portion; the connecting portion including at least two longitudinal rows of perforations and at least one adjacent longitudinal row of dents, pairs of longitudinal rows of perforations forming rows of tabs therebetween with longitudinally opposite ends of each tab being connected to relatively adjacent portions of the stock material.

8. A dunnage product as set forth in claim 7, wherein the connecting portion includes two rows of perforations and wherein one row of dents is situated between the two rows of perforations.

9. A dunnage product as set forth in claim 7, wherein the tabs in each row of tabs are laterally aligned with respective tabs in another row of tabs.

10. A dunnage product as set forth in claim 7, wherein the at least two rows of tabs are laterally spaced apart less than about one inch (2.5 cm).

11. A dunnage product as set forth in claim 1, having a width of less than about five inches (13 cm).

12. A dunnage product as set forth in claim 11, having a width of less than about four inches (10 cm).

13. A dunnage product as set forth in claim 1, wherein the two rows of tabs are laterally spaced apart less than about one inch (2.5 cm).

* * * * *

UNITED STATES PATENT AND TRADEMARK OFFICE

CERTIFICATE OF CORRECTION

PATENT NO. : 6,207,249 B1
DATED : March 27, 2001
INVENTOR(S) : Lencoski et al.

It is certified that error appears in the above-identified patent and that said Letters Patent is hereby corrected as shown below:

Claim 11,
Line 1, after "claim" please change "1" to -- 2 --.

Claim 13,
Line 1, after "claim" please change "1" to -- 2 --.

Signed and Sealed this

Twentieth Day of November, 2001

*Attest:*

Nicholas P. Godici

NICHOLAS P. GODICI

*Attesting Officer*

*Acting Director of the United States Patent and Trademark Office*